United States Patent [19]

Harlow

[11] 4,000,348
[45] Dec. 28, 1976

[54] FLAT MULTICONDUCTOR CABLE AND PROCESS FOR MANUFACTURE THEREOF

[75] Inventor: Norman Ralph Harlow, Central Valley, N.Y.

[73] Assignee: Carlisle Corporation, Tarrytown, N.Y.

[22] Filed: Sept. 2, 1975

[21] Appl. No.: 609,786

Related U.S. Application Data

[63] Continuation-in-part of Ser. No. 514,752, Oct. 15, 1974, abandoned.

[52] U.S. Cl. .................................. 428/422; 156/55; 156/229; 156/333; 428/463; 428/379; 174/110 FC
[51] Int. Cl.² .................... H01B 7/00; B32B 27/28; B32B 15/02
[58] Field of Search .......... 428/421, 422, 461, 463, 428/364, 379; 156/52, 55, 229, 333; 174/110 FC, 112

[56] References Cited

UNITED STATES PATENTS

| | | | |
|---|---|---|---|
| 2,833,686 | 5/1958 | Sandt | 156/309 |
| 3,082,292 | 3/1963 | Gore | 174/117 F |
| 3,215,574 | 11/1965 | Korb | 156/3 |
| 3,486,961 | 12/1969 | Adams | 428/421 X |
| 3,539,374 | 11/1970 | Isaacson | 428/461 X |
| 3,540,956 | 11/1970 | Arnold et al. | 156/54 |
| 3,649,434 | 3/1972 | Mortenson | 428/421 X |
| 3,664,915 | 5/1972 | Gore | 264/127 |
| 3,769,137 | 10/1973 | Moriyama et al. | 156/309 |
| 3,783,057 | 1/1974 | McNerney | 174/110 FC |
| 3,790,403 | 2/1974 | Ribbans | 428/422 X |
| 3,953,566 | 4/1976 | Gore | 264/288 |

*Primary Examiner*—Harold Ansher
*Attorney, Agent, or Firm*—Brooks, Haidt, Haffner & Delahunty

[57] ABSTRACT

Lamination of thermoplastic fluorocarbon resins with unsintered, extruded PTFE is accomplished in order to insulate products, such as conductors in the manufacture of multiconductor cable, by drawing the unsintered PTFE containing the product embedded in it pressed against the thermoplastic fluorocarbon resin through a sintering zone to melt the thermoplastic resin and snter the PTFE, thereby laminating the two together. In the preferred arrangement a second PTFE tape, which can be sintered or unsintered tape, is also laminated at the same time to the thermoplastic resin, such that the final product essentially presents PTFE outer surfaces with thermoplastic fluorocarbon resin bonding the layers of PTFE.

6 Claims, 12 Drawing Figures

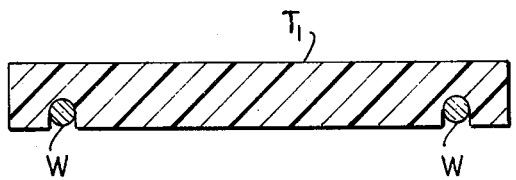
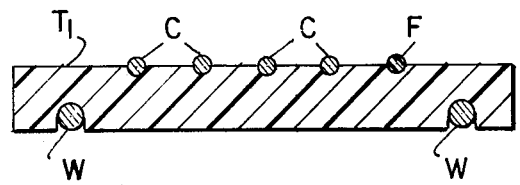
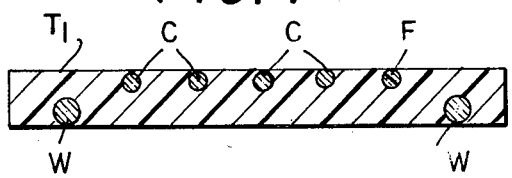
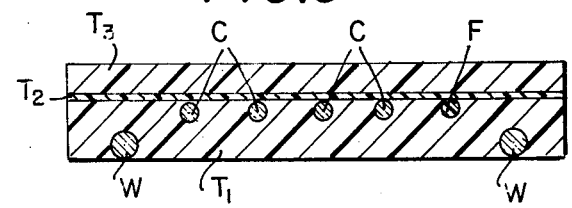
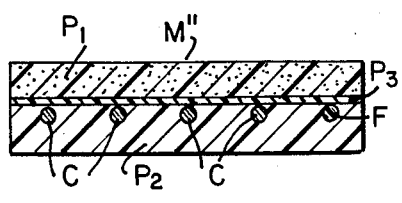
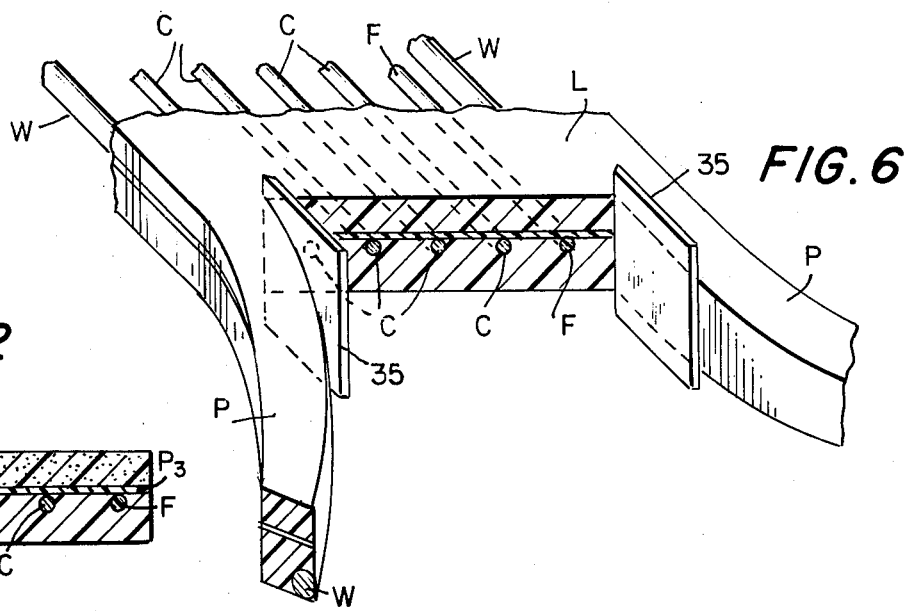
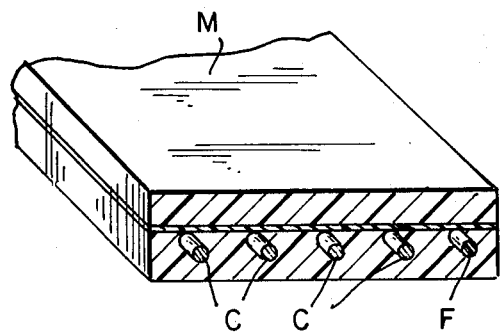
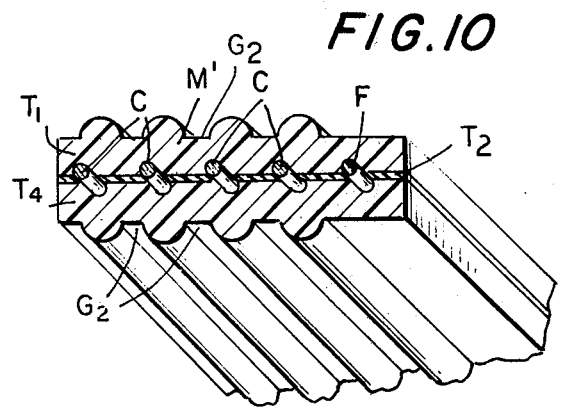

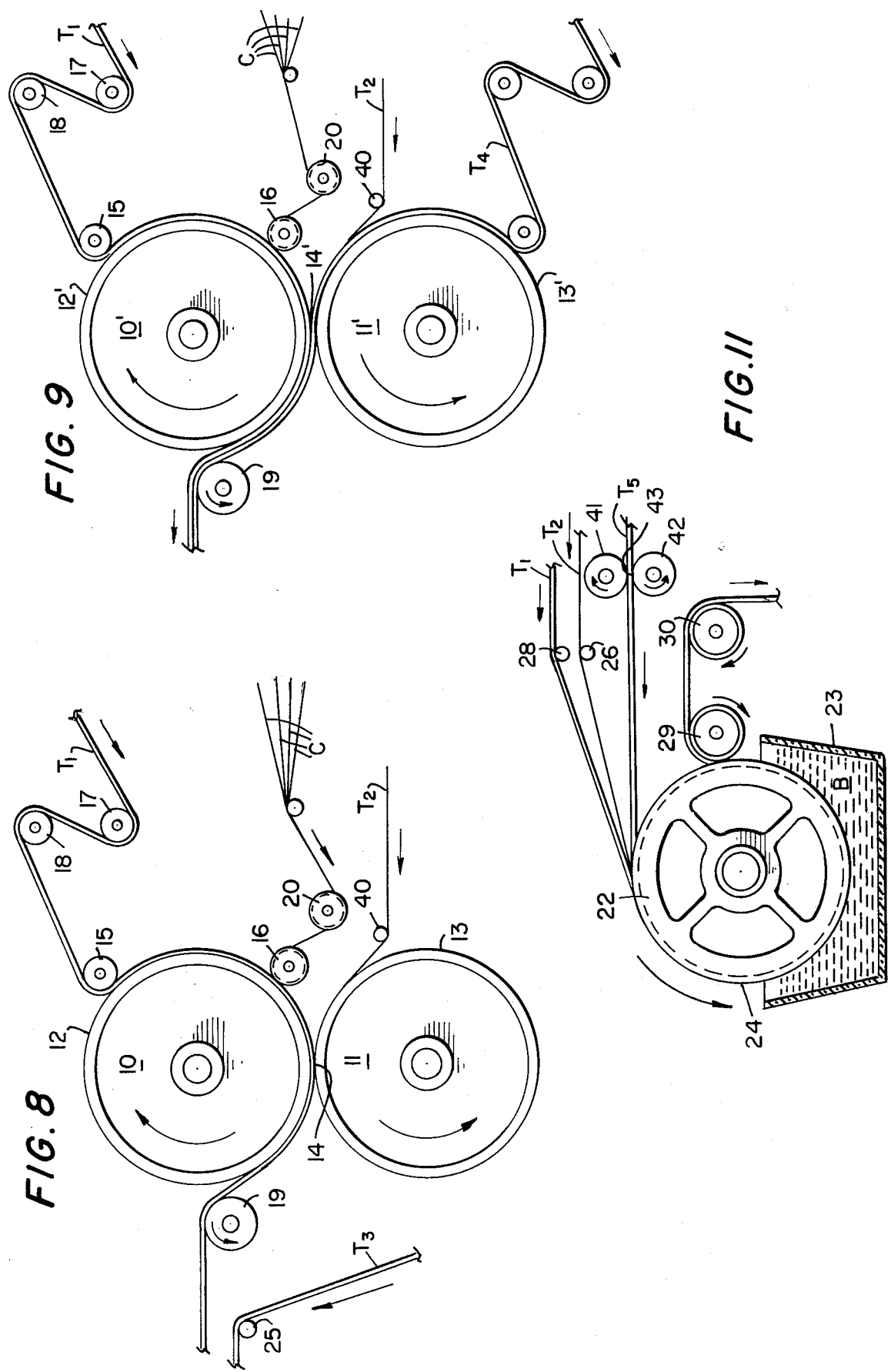

FLAT MULTICONDUCTOR CABLE AND PROCESS FOR MANUFACTURE THEREOF

RELATED CASE

This application is a continuation-in-part of Harlow application Ser. No. 514,752 filed Oct. 15, 1974, now abandoned.

This invention relates to the manufacture of flat multiconductor electric cable and in particular provides a new process for laminating fluorocarbon and similar high temperature resins in the construction of a multiconductor cable. This invention also provides new multiconductor cables suitable for high temperature use which are insulated with fluorocarbon or similar resins. In another aspect this invention also provides a process for bonding and sintering unsintered, extruded polytetrafluoroethylene (PTFE) with thermoplastic fluorocarbon resins and in turn to other materials including PTFE in various forms. In still another aspect this invention also provides a process for incorporation of low density PTFE in a laminated structure.

During the past 20 years the development of increasingly sophisticated computer hardware has led to a need for electric cable capable of carrying more signals at high frequencies and at lower signal levels than before. Flat multiconductor cable has found substantial use in meeting these requirements in interconnecting computer components, at least in part, because of its flexibility, its small bulk, the fixed geometric relationship between conductors and the relative simplicity of its manufacture.

At the same time the desirability of fluorocarbon and similar high temperature resins as insulating materials for such flat multiconductor cable has become apparent because of the ability of such fluorocarbon resins to withstand high temperatures and their relative inertness to chemical action, as well as their superior dielectric properties. Among the fluorocarbon resins which have been found useful in this industry are PTFE, the copolymer of tetrafluoroethylene and hexafluoropropylene (FEP), polyvinylidene fluoride (KYNAR), polychlorotrifluoroethylene (KEL-F), the copolymer of hexafluoropropylene and vinylidene fluoride (VITON), the copolymer of vinylidene fluoride and chlorotrifluoroethylene, the copolymer of tetrafluoroethylene and ethylene (TEFZEL) and the polymer of perfluoroalkoxy tetrafluoroethylene (PFA).

Generally two techniques have been used in fabricating flat multiconductor cable utilizing fluorocarbon resins. These are lamination and extrusion. Extrusion techniques have been found useful where the number of conductors is few, for example, two or three. However, generally the industry has adopted lamination techniques where large numbers of conductors are required and particularly where high precision in the spacing of conductors is required. With the exception of PTFE, which is not melt extrudable, lamination techniques have usually involved the use of a pair of laminating rolls which have a nip through which layers of insulating material are separately fed with the conductors between them. Various techniques have been utilized to control the spacing of the conductors up to the nip and to apply heat in the nip to cause the thermoplastic material to melt together around the wires forming the conductors.

The lamination techniques with thermoplastics suffer the disadvantage that control of conductor spacing is lost when the thermoplastic is melted, as it must be to achieve a bond, and the conductors "swim" in the molten thermoplastic. Various complicated remedies have been suggested to overcome this problem; Korb U.S. Pat. No. 3,215,574, Bohannon U.S. Pat. No. 3,239,396, and Emmel U.S. Pat. No. 3,802,974.

On the other hand unsintered, extruded tapes of PTFE can be laminated together with conductors between them at low temperatures and then passed to a sintering zone. Since unsintered PTFE does not melt during the sintering, the problem is obviated, if grooves are formed in the tapes to be laminated to receive the conductors, and the conductors can be aligned with precision (Arnold, et al., U.S. Pat. No. 3,540,956). The conductors can also be pressed into one or the other of the unsintered, extruded PTFE tapes before laminating (as used in rubber manufacture, for example, Midgley U.S. Pat. No. 1,742,777 and Benson U.S. Pat. No. 2,512,762), and the alignment will also be maintained.

Once laminated together, however, the assembly of unsintered, extruded PTFE tapes and conductors must be passed through an oven, salt bath or other heat treatment during which uncontrollable lateral shrinkage of PTFE takes place. In setting up the tool alignment for emplacement of the conductors in such a process complicated formulas are required to predict shrinkage in order that the resultant product will have the desired configuration.

It is thus an important object of this invention to provide a process for manufacturing flat multiconductor cable of fluorocarbon and similar resins which obviates the above disadvantages. Coincidentally the product of this process also has better bonding of laminae than is obtained in the prior flat laminated PTFE multiconductor cable and is dimensionally more stable on prolonged heating at elevated temperatures. It is thus also an object of this invention to provide a process for manufacture of flat, PTFE laminated cable having an improved bond between laminae.

It is a further object of this invention to provide a process for manufacture of flat laminated multiconductor cable having one lamina initially formed from unsintered, extruded PTFE tape which is sintered during the manufacturing operation and which is bonded to another lamina made of a material which is bonded only with a great deal of difficulty, such as sintered PTFE in the form of skived tape, low density (stretched) PTFE, and the like, as well as PTFE initially in the form of unsintered, extruded tape.

It is contemplated in accordance with the present invention that unsintered, extruded PTFE tape be utilized in conjunction with a thermoplastic fluorocarbon resin to form the insulation of a flat multiconductor cable. Since, as will be apparent below, the process of this invention contemplates sintering of the PTFE tape, the thermoplastics used must be capable of withstanding sintering temperatures without significant decomposition. Although PTFE sinters when its temperature is raised to about 625° F., it is common to find temperatures on the order of 680° –720° F. in a commercial sintering operating.

In the process of this invention the conductors are embedded in parallel relationship in one side of the unsintered, extruded PTFE tape, such that during subsequent sintering the PTFE tape holds the conductors in firm relationship with respect to each other and they do not swim, as in the case of embedment in thermoplastic. Generally the deeper the embedment of the conductors in the unsintered PTFE, the better will be the subsequent alignment.

The thermoplastic fluorocarbon resin can be any of the relatively high melting fluorocarbon resins, except PTFE which is not normally considered a thermoplastic. Thus any of the fluorocarbons found useful as insulation in manufacture of flat laminated cable can be utilized. These include PFA, KEL-F, TEFZEL and the like. The thermoplastic is preferably FEP, however. This is available in film form and is preferably useful in thickness of a few mils.

The thermoplastic fluorocarbon is applied to the side of the PTFE tape in which the conductors are embedded just prior to sintering, and the unsintered PTFE tape is held against the FEP or other thermoplastic fluorocarbon under light pressure, such that, as the PTFE and thermoplastic resin are brought up to the sintering temperature for the PTFE, the thermoplastic melts and bonds to the PTFE after cooling. This bond is a fairly strong bond as there is apparently some migration of the thermoplastic into the porous PTFE before sintering is completed. The thermoplastic fluorocarbon resin, however, even under microscopic examination, retains the appearance of a distinct layer in contact with the PTFE (except where the conductors are interposed between the thermoplastic fluorocarbon and the PTFE).

The need to place light pressure to hold the unsintered, extruded PTFE tape and thermoplastic fluorocarbon resin together during sintering of the PTFE can advantageously be used to bond the assembly to other materials with the thermoplastic fluorocarbon.

It is thus also contemplated in accordance with one aspect of this invention that a skived tape (sintered polytetrafluoroethylene) will be laminated together with the PTFE tape thermoplastic fluorocarbon resin. As skived tape is relatively inexpensive, it can be used to provide most of the insulation on one side of the conductors with the thermoplastic fluorocarbon resin serving primarily as a bonding agent between the PTFE tape and skived tape. In this arrangement again pressure is exerted on the PTFE tape to hold it against the thermoplastic and the assembly against the skived tape. During sintering the thermoplastic also bonds to the surface of the skived tape which is microscopically irregular due to the method of its manufacture. Suprisingly, only light tension on the PTFE tape and embedded conductors is required to obtain complete lamination.

Preferably sintering is accomplished utilizing a salt bath and the pressure applied by the PTFE tape to the thermoplastic and skived tape is obtained by rolling the assembly over a roller, e.g., a cast iron wheel, which dips into the salt bath. In this arrangement the laminae are laid on the rim of the roller with the skived tape against the roller and the unsintered PTFE tape on the outer side of the roller with the thermoplastic between them. The necessary pressure to produce bonding during lamination in the salt bath is obtained by slight tension placed on the unsintered PTFE tape as it approaches the roller.

Since the skived tape is dimensionally stable during sintering, that is, its dimensions after sintering are essentially those before sintering, the skived tape functions in this arrangement to limit lateral shrinkage of the unsintered PTFE tape as it undergoes sintering. Consequently, the alignment of the conductors when they are embedded in the unsintered PTFE tape is essentially the alignment desired in the finished conductor.

In another aspect of this invention the assembly of unsintered, extruded PTFE tape, conductors and thermoplastic fluorocarbon resin can be alternatively bonded to another tape of unsintered, extruded PTFE which also undergoes sintering simultaneously with the first tape in which the conductors are embedded. The use of such a second initially unsintered, extruded PTFE tape to complete the insulation for the conductors is desirable particularly where both surfaces of the final product are required to be ribbed or otherwise embossed, for example, to minimize cross-talk when a number of cables are stacked one on the other.

Still another alternative having particular advantage is the use of unsintered, extruded PTFE tape as the other outside lamina in which the tape has been stretched in order to lower its density (see Gore U.S. Pat. No. 3,664,915). In fact the present process permits such a stretched, low density unsintered, extruded PTFE tape to be laminated in a multiconductor cable construction where this was not heretofore practical, since only light pressure is required in holding the assembly together while it is sintered and since no pressuring stage is required to position the conductors between the PTFE tapes, but only to embed them in one of the PTFE tapes. Thus the unsintered, extruded PTFE tape which has been stretched can be applied to the previously assembled unsintered, extruded tape in which the conductors are embedded immediately prior to the sintering stage obviating the need to pass the stretched tape through the conventional calender rolls. This can be accomplished because the present process provides an arrangement in which the thermoplastic fluorocarbon resin will melt during the sintering operation to bond the two outer laminae of PTFE together about the conductors embedded in the one. Generally, wrinkling occurs along the edges of the laminated product because of the shrinkage of the PTFE tape as it sinters and cools. This wrinkling can be prevented from extending into the area of the conductors by applying a pair of wires, one adjacent each marginal edge of the unsintered tape beyond the position of emplacement of the conductor wires. The wires which are used to control shrinkage should have a low thermal coefficient of expansion and can be, for example, wrought iron wires. They are applied and embedded into the same unsintered polytetrafluoroethylene tape in which the conductors are embedded prior to sintering on the reverse side of the tape from the conductors, such that the wires used to prevent spreading of wrinkling also function to aid in holding the PTFE tape against the thermoplastic and underlying lamina as these go through the sintering bath. Finally, these iron wires or the like can be used as guides for slitting to trim off the wrinkling which occurs in the margins after sintering.

For a more complete understanding of the practical application of this invention reference is made to the appended drawings in which:

FIG. 2 is an enlarged cross-section taken at line 2—2 in FIG. 1;

FIG. 3 is an enlarged cross-section taken at line 3—3 in FIG. 1;

FIG. 4 is an enlarged cross-section taken at line 4—4 in FIG. 1;

FIG. 5 is an enlarged cross-section taken at line 5—5 in FIG. 1;

FIG. 6 is a fragmentary enlarged perspective view illustrating one step in carrying out the process of this invention;

FIG. 7 is an enlarged fragmentary perspective view of the product manufactured by the process schematically represented in FIG. 1;

FIG. 8 is a view corresponding to part of FIG. 1 showing a modification in the process of this invention;

FIG. 9 is a view similar to FIG. 8 showing a different modification of the process;

FIG. 10 is an enlarged, fragmentary perspective view of the product of the modification of FIG. 9;

FIG. 11 is a view corresponding to a different portion of FIG. 1 showing yet another modification of the process of this invention; and FIG. 12 a cross-section similar to FIGS. 2-5 but taken of the final product of the modification of FIG. 11.

Figure 1:
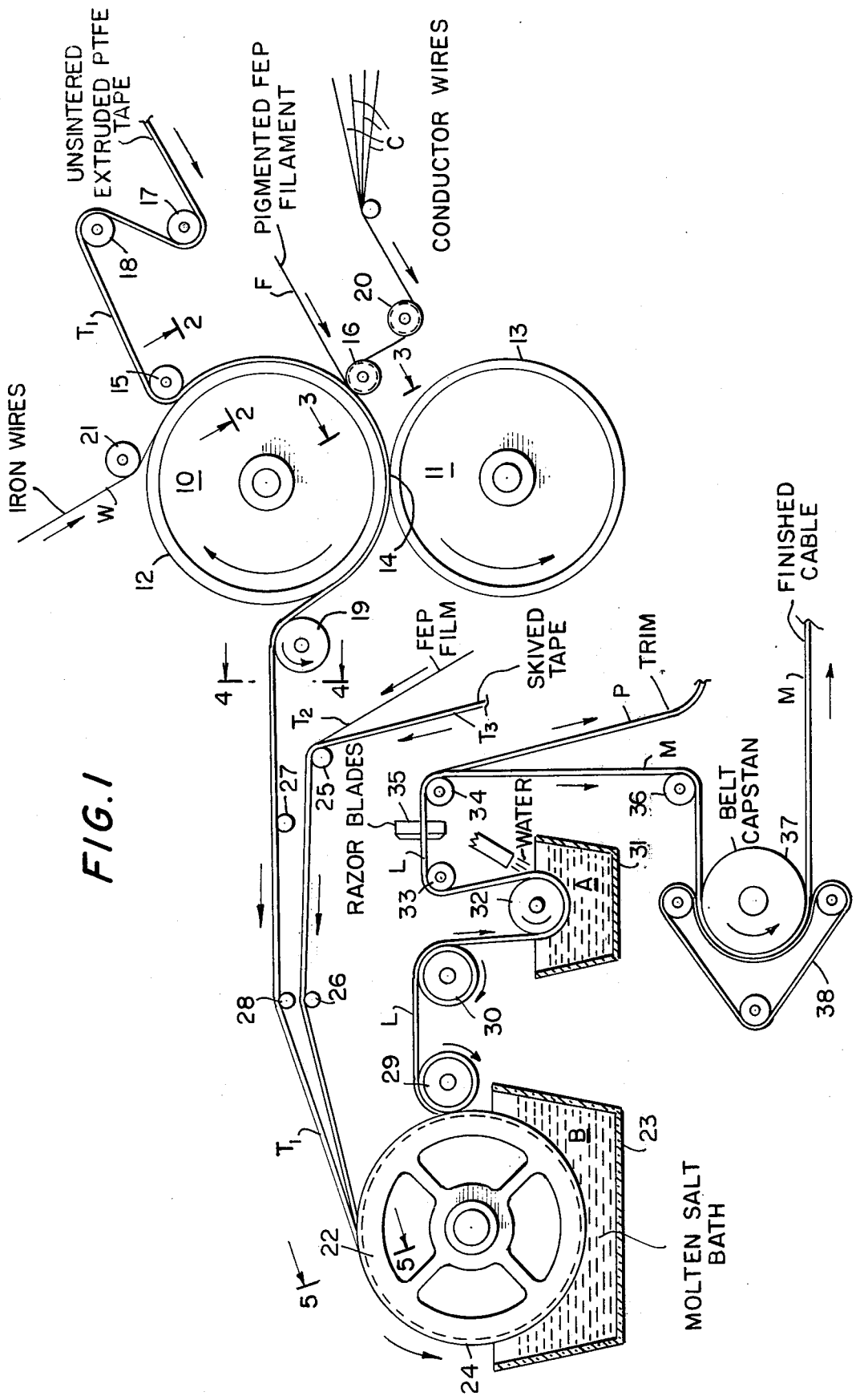
FIG. 1 is a schematic representation of the process of this invention.

Referring to FIG. 1 the reference numerals 10 and 11 refer to a pair of counter-rotating calender rolls having flat polished rims 12 and 13, respectively. In some cases discussed below rim 12 and in some cases rim 13 can also be provided with grooves, as described in Gore U.S. Pat. No. 3,082,292. Calender rolls 10 and 11 are driven together, such that their peripheral surfaces 12 and 13 have the same linear rates of speed, calender roll 11 being driven in a counterclockwise direction, as seen in FIG. 1. Rolls 10 and 11 are driven on vertically aligned horizontal axes, such that they form a nip indicated by the reference numeral 14. The spacing of rims 12 and 13 in nip 14 is adjustable.

Associated with calender rolls 10 and 11 are an idle roll 15 which is spring biased against rim 12 of roll 10 approximately 120° ahead of nip 14 and an idle conductor guide roll 16 which is similarly spring biased against rim 12 at a location approximately 45° in advance of nip 14.

Unsintered, extruded PTFE tape $T_1$ is fed from a supply reel (not shown) about a pair of idle tension rollers 17 and 18 to roller 15 which applies tape $T_1$ against the rim 12 of calender roll 10, such that tape $T_1$ passes guide roller 16 through nip 14 and is removed from the surface of rim 12 about an idle take-off roller 19. The tension on roller 15 is such that tape $T_1$ is held firmly against rim 12 without compression. Take-off roller 19 is spaced slightly away from the surface of rim 12 and is located approximately 80° after nip 14.

Guide roller 16 is a small brass cylinder mounted for rotation closely adjacent the surface of rim 12 of calender roll 10 and is provided with a number of parallel grooves of vee-shaped configuration which are designed to receive wires C which are to form the conductors in the ultimate product. The size of wires C thus determines the size of the grooves in roll 16, which is provided with one groove for each wire C and also with an additional groove which receives a filament F of FEP. FEP filament F is pigmented, and the groove in roller 16 which receives it is located at the end of the roller 16, such that filament F is pressed into tape $T_1$ adjacent one of its lateral margins. Wires C are fed to guide roller 16 from a creel of spools (not shown) from which wires C are fed to a fixed comb 20 over suitable tension rolls (not shown).

As described above, the apparatus set-up is conventional and typical of that utilized in the manufacture of PTFE flat laminated cable, the difference being that in the ordinary manufacture of PTFE flat laminated cable a second tape of unsintered, extruded PTFE is brought similarly about rim 13 of calender roll 11 to nip 14 where it is laminated against tape $T_1$ to cover wires C. In the process shown in FIG. 1, however, the second tape of unsintered, extruded PTFE is not employed (see FIG. 9, however, and the discussion, below, of the modification shown in FIG. 9).

Additionally a pair of iron wires W are laid over a guide roller 21 on the surface of rim 12 slightly ahead of the location of roller 15, such that wires W ride between tape $T_1$ and the rim 12 of calender roll 10. The tension on roller 15 is such that tape $T_1$ is pressed firmly against rim 12, and hence wires W are embedded into tape $T_1$, as shown in FIG. 2. Similarly, conductor wires C and FEP filament F are embedded (but typically half way) in tape $T_1$ by guide roller 16, as shown in FIG. 3.

As the assembly of wires W, tape $T_1$, parallel conductors C and filament F is passed through nip 14 between calender rolls 10 and 11, tape $T_1$ is compressed and conductors C and filament F are pressed and fully embedded in tape $T_1$, as shown in FIG. 4.

Tape $T_1$ with embedded wires W, conductors C and filament F is laminated with a thin film of FEP $T_2$ and with skived tape $T_3$ and brought to sintering temperature on a cast iron wheel 22. Wheel 22 is mounted for free rotation on a horizontal axis and has its lower portion dipped in a bath B of molten eutetic salt mixture typically at 700° F. maintained in a refractory tank 23.

Skived tape $T_3$ is passed over suitable guides 25 and 26 onto the rim 24 of wheel 22 on the upper side of wheel 22. Guides 25 and 26 typically are fixed rods mounted horizontally with stops to control lateral movement of tape $T_3$. FEP film $T_2$ is also fed over guides 25 and 26 overlying skived tape $T_3$, such that skived tape $T_3$ is against the rim 24 of wheel 22 with FEP film $T_2$ overlying it. Tape $T_1$ with its assembled wires W, conductors C and filament F is similarly brought over similar guides 27 and 28 to the upper surface of wheel 22 in a position overlying tapes $T_2$ and $T_3$ (see FIG. 5). At this point on the upper surface of wheel 22 the assembly begins to heat as it is drawn over counter-rotating wheel 22 into bath B.

As the assembly of tapes and other components is dipped into bath B on wheel 22, its temperature is rapidly brought to about 700° F. At this temperature, of course, FEP film $T_2$ melts and tape $T_1$ undergoes sintering. The FEP film $T_2$ to some extent migrates into the interstices of tape $T_1$, which is porous, before sintering is completed, and forms a strong bond with tape $T_1$ after cooling. At the same time the surface of tape $T_3$ is microscopically rough and FEP film $T_2$ bonds to it after cooling.

The laminated assembly L is removed from rim 24 of wheel 22 after this rises above the level of bath B on an idle wheel 29 which is tangent with the surface of assembly L and directs assembly L to another idle wheel 30 located above a coolant water bath A maintained in a tank 31. Assembly L is drawn down into water bath A about an idle roll 32 the underside of which is in bath A and then is drawn upwardly out of bath A about an idle roll 33 on an angle permitting the introduction of coolant water to the surface of assembly L just above roll 32 with collection of the coolant water in bath A. The cooled assembly L is then drawn from roller 33 horizontally to an idle roller 34.

Not shown in the drawings is the fact that the marginal edges of laminated assembly L tend to become wrinkled having passed through the stages of expansion and contraction induced by raising tape $T_1$ to sintering temperature and then cooling. Wires W, it will be noted, are so designed that they lie on the outer side of assembly L as it passes through bath B and also as it passes through bath A. These wires are of iron or other material having a relatively low thermal coefficient of expansion. Consequently, the tension placed on laminated assembly L as it passes through baths B and A, and particularly as it passes through salt bath B, is in a large part maintained by wires W. Thus the marginal rippling effect or wrinkling which occurs is contained in the marginal portions of the laminated assembly L by wires W and does not affect the inner conductor wires C and filament F or disturb their spacing. The tension of wires W also aids in holding tape $T_1$ firmly against tapes $T_2$ and $T_3$ to insure proper bonding.

In passing between rollers 33 and 34 along a generally horizontal line laminated assembly L is drawn through the path of two razor blades 35 which are located vertically (see FIGS. 1 and 6) and positioned to trim the wrinkled edge margins P of laminated assembly L. In particular blades 35 are positioned to wipe against the inner faces of iron wires W. Thus wires W serve as guides for removal of the marginal portions P of assembly L, as assembly L is drawn past blades 35. Marginal portions P are thus trimmed off leaving the final desired multiconductor cable M (FIG. 7) with conductor wires C spaced generally according to the original location as aligned by guide roll 16 and with pigmented FEP filament F along one edge serving as a code to locate that edge in subsequent connecting operations.

The resultant cable M is separated from trim P and drawn over an idle roller 36 about a belt capstan 37 in which multiconductor cable M is firmly held against a rotating capstan by a belt 38. Belt capstan 37 and calender rolls 10 and 11 are the only driven portions of the assembly and have a common drive with a slip clutch on the drive for calender rolls 10 and 11 which is set to place just that required degree of tension on tape $T_1$ as it passes into the laminating and sintering stage on wheel 22, which is sufficient to prevent the ripples and wrinkles in the marginal portions P extending into laminated assembly L between outside guide wires W.

Generally the sizes of multiconductor cable which are manufactured in accordance with the present invention are those which are conventionally used. As illustrated tape $T_1$ can be a 22 mil thick unsintered, extruded tape; iron wires W can be 30 AWG (10 mils); conductors C can be silver plated copper conductors of 33 AWG (7 mils); FEP filament F is ordinary pigmented FEP and has a diameter of 15 mils. After compression in nip 14 the assembly shown in FIG. 4 is reduced to a thickness of about 18 mils. FEP film $T_2$ is 2 mils thick, and skived tape $T_3$ is 10 mils thick. The width of the materials are only limited by the size of machinery involved. The spacing of the conductors C can be anything from 10 to 100 mils or more and typically are 25 to 50 mils. In the illustrated arrangement wheel 22 is a 15 inch diameter cast iron wheel, and approximately one-quarter of its rim is dipped in salt bath B which is a proprietary product sold under the name HYTEC. The salt bath is maintained at 700° F. and the peripheral rate of speed of wheel 22 is 10 feet/-min. Consequently the exposure of the assembly in bath B is about 6 seconds.

FIG. 8 illustrates a variation of the process described above with reference to FIGS. 1–7. While initially it was believed that the thermoplastic fluorocarbon film $T_2$ should be led to wheel 22 separately from the assembly of the unsintered, extruded PTFE tape $T_1$ and embedded conductors C, it has now been found that a better bond between the unsintered tape $T_1$ and FEP film $T_2$ is obtained when film $T_2$ is applied to the surface of tape $T_1$ containing embedded conductors C in nip 14 between calender rolls 10 and 11. This modification is illustrated in the fragmentary diagram of FIG. 8 in which a tape of thermoplastic fluorocarbon $T_2$ is shown being fed to rim 13 of calender roll 11 about a horizontal fixed guide rod 40. Rod 40 is located such that tape $T_2$ contacts rim 13 about 45° ahead of nip 14. Thus when conductors C are pressed firmly into tape $T_1$ thermoplastic fluorocarbon resin tape $T_2$ is also pressed against tape $T_1$ and carried with tape $T_1$ over idle roller 19, guides 27 and 28 to wheel 22 where they are contacted with tape $T_3$ and brought to sintering temperature to sinter tape $T_1$ and melt film $T_2$ bonding tapes $T_1$ and $T_3$ about conductors C.

In many instances it is found useful to bring an air dielectric close to the spacing between conductors C. In some instances this can be simply accomplished by providing rim 12 of calender roll 10 with grooves which are aligned with the intended location of conductors C, such that deep grooves extend into PTFE tape $T_1$ such that air is a part of the dielectric path between adjacent conductors C.

More often, however, when air dielectric is required for example, when cables are to be stacked in multilayer, parallel arrangement it is desirable to groove or otherwise emboss both surfaces of the multiconductor cable M', as shown in FIG. 10, in order to provide better spacing with air dielectric and thus minimize cross-talk. In this event the use of sintered PTFE tape, such as skived tape, is precluded since it is difficult to reform the surface of sintered PTFE.

Grooves $G_1$ and $G_2$ are formed in the surfaces of cable M' by constructing cable M' utilizing a pair of calender rolls 10' and 11' (see FIG. 9) which are substituted for calender rolls 10 and 11 shown in FIG. 1 and which differ in that they are provided with peripheral grooves designed to register with conductors C. In this arrangement the thermoplastic fluorocarbon tape, i.e., film $T_2$, is applied about roll 40 so that it is fed to nip 14' between calender rolls 10' and 11' as described with reference to FIG. 8, except that a second tape $T_4$ of unsintered, extruded PTFE is fed to nip 14' on the rim 13' of calender roll 11' in a fashion similar to that by which tape $T_1$ is fed to nip 14' about the rim 12' of calender roll 10'. Thus, as the two unsintered, extruded PTFE tapes $T_1$ and $T_4$ are brought together in nip 14' with conductors C embedded in tape $T_1$, thermoplastic fluorocarbon tape $T_2$ is fed to nip 14' such that tape $T_2$ is positioned between tapes $T_1$ and $T_4$.

The pressure on calender rolls 10' and 11' is essentially that used heretofore in making flat laminated PTFE multiconductor cable utilizing unsintered, extruded PTFE tapes. The bond obtained between $T_1$ and $T_4$ is about 100% better than obtained between unsintered, extruded PTFE tapes without the thermoplastic fluorocarbon resin interposed.

The assembly of tapes $T_1$ and $T_4$ with tape $T_2$ and conductors C positioned between them is carried onto the rim 12' of calender roll 10' as it leaves nip 14', is taken off over idle roll 19, and is carried to wheel 22 and through salt bath B, as described with reference to FIG. 1 except that skived tape $T_3$ is not added to the assembly.

The sintered final product is characterized by an extremely strong bond between the PTFE laminae. This can be illustrated with reference to three samples made with identical geometry. Each was a cable having an overall width of 1.200 inches and a thickness of 0.027 inches. Sixty-nine conductors were positioned centered in the insulation. Each of the conductors was a 33 AWG silver plated strand. The conductros were arranged as ground-signal-ground, ground-signal-ground, across the cable, such that there were 23 signal carrying conductors. The spacing between the ground conductors was 0.010 inches and the spacing between each signal conductor and its adjacent grounds was 0.0205 inches, In one case the cable was manufactured using two unsintered, extruded PTFE tapes which were pressed together in the nip without any interposed FEP or other thermoplastic fluorocarbon. In the second case the cable was manufactured substantially as described above with reference to FIG. 1. In the third case the cable was manufactured as described above with respect to FIG. 9, except that no grooves were used on the calender rolls. In the second and third cases the FEP film was 2 mils thick.

In the first case delaminating the sintered PTFE tapes required 10 pounds of pull. In the second case (using the skived tape and FEP) over 15 pounds was required before the PTFE laminae could be peeled apart. In the third case (utilizing the two unsintered, extruded PTFE tapes with the interposed FEP film) the laminae could not be peeled apart but destructed without reference to the bond between them.

In addition to the better bond obtained in the process of this invention, the occurrence of flaws is reduced. Thus greater flaw-free lengths are produced.

With minor modification the apparatus of FIG. 1 can be utilized to construct a multiconductor cable including a lamina $T_5$ of stretched, low density PTFE. The use of low density material is of obvious economic value.

When unsintered, extruded PTFE tapes are stretched, for example, by running between two pairs of calender rolls with the second pair of calender rolls driven at a faster rate of speed than the first, the elongation of the tape is taken up by a volume expansion. As a result a lower density product is obtained. This phenomenon is discussed in Gore U.S. Pat. No. 3,664,915. Normally it is not feasible to include such a low density material in a laminated cable structure, because the pressure required in laminating through a pair of calender rolls will compress the stretched tape and return it essentially to its original gravity. Since the present process, however, effects a bond with PTFE utilizing only a light pressure the process of this invention can be utilized to form laminated structures including a lamina obtained by sintering stretched PTFE tape. The process of this invention, moreover, can be utilized in such a manner the tape is stretched while it is being laminated.

Thus referring to FIG. 11 there is shown a portion of the apparatus of FIG. 1 in which the application of unsintered, extruded PTFE tape $T_5$ is substituted for the skived tape $T_3$. In this arrangement unsintered, extruded tape $T_5$ is introduced to the apparatus under stretching tension by restraining rolls 41 and 42 which cooperate to form a nip 43.

Rolls 41 and 42 are counter rotation and driven at the same peripheral rate of speed which is less than the peripheral rate of speed of wheel 22, typically one half the rate of speed of wheel 22, such that unsintered, extruded tape PTFE $T_5$ stretches between nip 43 and the point where tape $T_5$ contacts rim 24 of wheel 22. FIG. 12 illustrates the resultant sintered product M'' which is a sintered assembly of PTFE having a low density portion $P_1$ on one side, a high density portion $P_2$ on the other side in which conductor C and filament F are retained separated by a very thin layer $P_3$ of FEP.

It is apparent that multilayer cable can also be made in accordance with this invention. Thus, two layers of unsintered, extruded PTFE tape could be prepared as in the case of FIG. 10, but with each having embedded conductors. These are then passed about wheel 22 with a layer of FEP between them or with three layers, two of FEP and one of skived tape between them. Other combinations are immediately evident. It will be also apparent that while the preceding discussion has been confined to the manufacture of multiconductor cable, other components than conductors can be laminated in accordance with this invention. Thus, for example, flexible copper circuits die-cut from copper foil can be fed in place of conductors C and then later the final assembly can be divided up to each discrete component.

It will be understood that unsintered, extruded PTFE as used herein, refers to the product obtained by extruding PTFE extrusion grade powder admixed with an extrusion aid, such as V.M.&P. naphtha, followed by removal of the extrusion aid, as by low temperature heating or solvent leaching. Generally, but not necessarily, the extruded PTFE is calendered before removal of the extrusion aid.

It will be noted that skived tape, as used herein, refers to sintered PTFE in tape form obtained by shaving from a billet of sintered PTFE. It should be understood that sintered PTFE in sheet form, however obtained, can be substituted. Indeed, a flat multiconductor cable made by laminating unsintered, extruded PTFE tapes and sintering them could be substituted. Generally economic considerations dictate the employment of skived tape in preference to other forms of sintered PTFE. Indeed, the multiconductor cable described above with reference to FIGS. 1–7, due to its employment of skived tape as insulation, is less costly than its counterpart made by the prior flat laminated PTFE process.

While the preceding description refers to round, single stranded conductors, it will be apparent that multistranded conductor and other conductor configurations can be employed. The conductors can also be insulated, for example, with PTFE resin.

I claim:

1. A process for producing flat multiconductor cable which comprises drawing a first sheet of unsintered, extruded PTFE having a plurality of parallel conductors embedded lengthwise in one surface thereof together with a second sheet of thermoplastic fluorocarbon resin and a third sheet of sintered PTFE disposed on the opposite side of said second sheet of thermoplastic fluorocarbon resin from said first sheet of unsintered, extruded PTFE lengthwise through a sintering zone for a sufficient period of time and at a sufficient temperature to sinter said extruded PTFE and to melt said thermoplastic fluorocarbon resin while pressing said extruded PTFE sheet against said fluorocarbon resin and said sintered PTFE with said conductors between said first and second sheets whereby upon removal of the assembly from said sintering zone and then cooling, said three sheets are laminated together.

2. A process according to claim 1 in which said thermoplastic fluorocarbon is the copolymer of tetrafluoroethylene and hexafluoropropylene (FEP).

3. A process according to claim 1 in which a pair of metal wires of a metal having a low thermal coefficient of expansion are embedded in said unsintered, extruded PTFE sheet on the side thereof opposite said conductors, one of said wires being located in each marginal portion of said sheet.

4. A process according to claim 3 in which the marginal portions of the laminated assembly withdrawn from said sintering zone are trimmed against said metal wires as guides.

5. The product of the process of claim 1.

6. The product of the process of claim 2.

* * * * *